US011403475B2

(12) United States Patent
Suman

(10) Patent No.: US 11,403,475 B2
(45) Date of Patent: Aug. 2, 2022

(54) DPM BARCODE READER HAVING A PARTIALLY POLARIZED WINDOW COUPLED TO DIFFUSIVE, POLARIZED AND BRIGHT FIELDS OPPORTUNELY TUNED TO PARTICULAR WAVELENGTHS

(71) Applicant: Datalogic IP Tech S.r.l., Calderara di Reno (IT)

(72) Inventor: Michele Suman, Ponte San Nicolo (IT)

(73) Assignee: DATALOGIC IP TECH S.r.l., Calderara di Reno (IT)

( * ) Notice: Subject to any disclaimer, the term of this patent is extended or adjusted under 35 U.S.C. 154(b) by 0 days.

(21) Appl. No.: 16/229,130

(22) Filed: Dec. 21, 2018

(65) Prior Publication Data

US 2020/0202089 A1 Jun. 25, 2020

(51) Int. Cl.
*G06K 7/10* (2006.01)
*G06K 7/14* (2006.01)

(52) U.S. Cl.
CPC ..... *G06K 7/10831* (2013.01); *G06K 7/10386* (2013.01); *G06K 7/10732* (2013.01); *G06K 7/1417* (2013.01)

(58) Field of Classification Search
CPC .................................................. G06K 7/10831
USPC .................................................... 235/462.09
See application file for complete search history.

(56) References Cited

U.S. PATENT DOCUMENTS 9,033,237 B1 5/2015 Chi
9,542,583 B2 1/2017 Nagata et al.
2011/0042591 A1* 2/2011 Kurose .................... G06K 7/12 250/566
2012/0067955 A1* 3/2012 Rowe .................. G06K 7/1417 235/454
2012/0169910 A1* 7/2012 Singh ..................... H04N 5/349 348/302
2013/0221101 A1* 8/2013 Lebaschi ............. G06K 7/0004 235/454

* cited by examiner

*Primary Examiner* — Rafferty D Kelly
(74) *Attorney, Agent, or Firm* — Foley & Lardner LLP

(57) ABSTRACT

A system and method process for imaging DPM codes by a handheld barcode reader may include outputting a polarized light beam from an exit window of the handheld barcode reader to illuminate a direct part marking (DPM) code positioned on an object over a first time period. A non-polarized light beam may be output via from the exit window of the handheld barcode reader over a second time period. Reflected light from the object including polarized light from the DPM code received via a partially polarized receiving window may be sensed. The DPM code may be decoded by the handheld barcode reader.

20 Claims, 7 Drawing Sheets

DPM BARCODE READER HAVING A PARTIALLY POLARIZED WINDOW COUPLED TO DIFFUSIVE, POLARIZED AND BRIGHT FIELDS OPPORTUNELY TUNED TO PARTICULAR WAVELENGTHS

BACKGROUND

Barcode readers are used for a variety of industrial, commercial, and consumer purposes. The readers are configured to image or scan, decode, and read machine-readable indicia, such as barcodes, quick reference (QR) codes, direct part marking (DPM) codes, and/or any other indicia, including alphanumeric markings, that are typically printed on objects. In manufacturing environments, objects, such as machine and other parts (e.g., automobile parts) and final products (e.g., tweezers), often have DPM codes, which often include barcodes, QR codes, alphanumeric text, symbols, or otherwise, marked on or embedded into the objects themselves.

The objects on which DPM codes may be formed may be of a variety of materials, such as metal, plastic, wood, silicon, metallic alloys, glass, or any other material. Different materials may have different levels of reflectance and light absorption. For example, shiny metal may have a high degree of reflectance, while a metal with a matte finish may have a lower degree of reflectance. Still yet, plastic may have a different level of reflectance. Also, different colors of material and DPM codes may have a different levels of reflectance. For barcode readers, the different levels of reflectance affects the ability to image, decode, and read the DPM codes with a high degree of success, which is generally needed in industrial and commercial environments.

There have been a number of technical advancements of barcode readers that help reduce or eliminate the problems of capturing images of DPM codes marked on different materials. Such advancements of barcode readers for more accurately reading DPM codes include lighting solutions to increase brightness, angles, spectral ranges, polarization, and so forth. The different lighting solutions, however, may negatively impact power usage during operation if additional lighting and/or power is used to increase brightness, for example. For fixed barcode readers, electricity is available from a power grid, so that power consumption due to lighting is immaterial. However, for handheld barcode readers, power used to power lights to illuminate and capture DPM codes can quickly drain a battery during operation, especially when using brighter lights for illumination of the DPM codes. Because the lighting, especially bright light sources, consume power that reduce battery life faster than desired, simply raising brightness of lighting is not always desirable. In cases where a polarizing filter(s) are used to polarize light for reading DPM codes on an object more effectively, received light by an image sensor of the barcode reader is reduced by upwards of 75% as a result of the source lighting passing through a polarization filter and reflected light from the object passing through another polarization filter that each reduce the light by 50%. To help offset the loss of light, the lighting source may be increased in brightness, but that increase results in an increase of power consumption and a reduction of the battery life, thereby limiting the handheld barcode reader usage time. As such, there is a need to improve lighting for reading DPM codes that will minimize power consumption so as to help maintain battery life for handheld barcode readers.

SUMMARY

To overcome the problem of increased power consumption of handheld barcode readers when increasing lighting to offset the use of polarization filters, the principles described herein provide for a lighting system of a handheld barcode reader that includes a first lighting source that outputs a light beam via a partially polarized lighting path (e.g., exit window) to create a polarized light beam and a second lighting source that outputs a non-polarized portion of the lighting path (e.g., another portion of the exit window) that creates a bright light beam when illuminating a DPM code. Additionally, a third lighting source may be diffused to output a diffused light beam to illuminate a DPM code on an object. The three different light beams may be selectably used for illuminating objects with different materials, such as (i) a metal object with a reflective surface, (ii) a metal or other material object with a matte finish, and (iii) plastic or other material surfaces.

In operation, one of the lighting sources may be turned on at a time to limit power usage when reading DPM codes by the handheld barcode reader. Alternatively, two of the lighting sources may be turned on simultaneously to provide for brighter lighting and/or contrast when imaging DPM codes. In another embodiment, the barcode reader may be manually set to use one of the illumination sources (e.g., polarized light, non-polarized bright light, or diffused light). In another embodiment, the barcode reader may capture an image of a DPM code, determine whether the DPM code was properly decoded or measure an image parameter (e.g., brightness level) and automatically switch the illumination source if the DPM code fails to properly decode or the measured parameter fails to meet a threshold level. In yet another embodiment, the barcode reader may be configured to capture two or more images of the DPM code by successively using two or more of the lighting sources (e.g., polarized light, non-polarized light, diffused light) so that any of the two or more images may be selected for use in decoding and reading the DPM code.

One embodiment of a handheld barcode reader may include a housing defining an opening. An exit window may be disposed in the opening of the housing. A first light source may be disposed within the housing. A polarizing filter may be disposed in front of the first light source to cause a polarized light beam to illuminate a direct part marking (DPM) code on an object. A second light source may be disposed within the housing, and arranged to output a non-polarized light beam via a transparent portion of the exit window. Receiving optics may be configured to receive reflected light from the object and including light representative of the DPM code via a partially polarized receiving window. An optical sensor may be configured to sense the reflected light via the receiving optics and generate image data. A processor may be configured to process the image data to decode and read the DPM code.

One embodiment of an illustrative process for imaging DPM codes by a handheld barcode reader may include outputting a polarized light beam from an exit window of the handheld barcode reader to illuminate a direct part marking (DPM) code positioned on an object over a first time period. A non-polarized light beam may be output via from the exit window of the handheld barcode reader over a second time period. Reflected light from the object including polarized light from the DPM code received via a receiving window may be sensed. The DPM code may be decoded by the handheld barcode reader.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
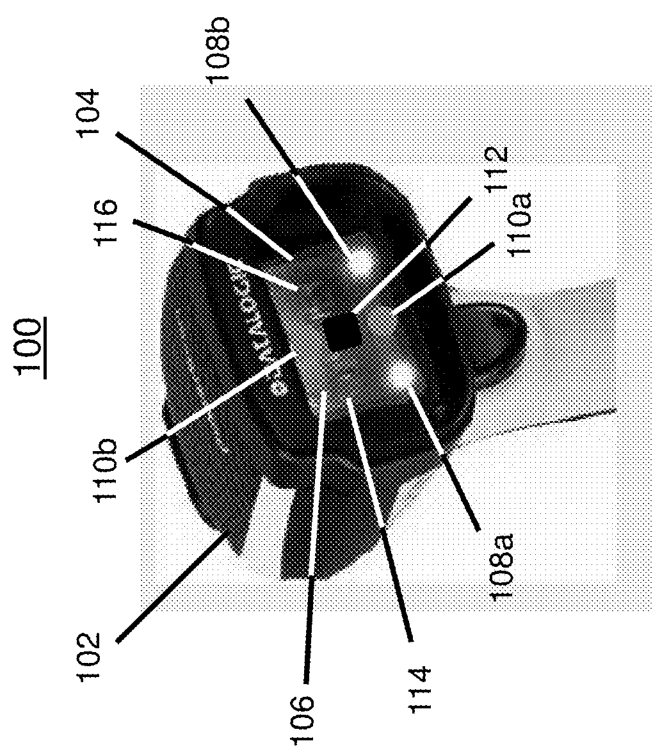
FIG. 1 is an illustration of an illustrative handheld barcode reader configured to output non-polarized light beams and polarized light beams for reading direct part marking (DPM) codes and other machine-readable indicia.

With regard to FIG. 1, an illustration of an illustrative handheld barcode reader 100 configured to output non-polarized light beams and polarized light beams for reading direct part marking (DPM) codes and other machine-readable indicia is shown. The handheld barcode reader 100 may further be configured to output diffused light beams for reading DPM codes and other machine-readable indicia. The handheld barcode reader 100 may include a housing 102 that defines a window 104 within which an exit window 106 is positioned. The reader 100 may include light sources 108*a* and 108*b* (collectively 108) that are configured to generate light beams, and light sources 110*a* and 110*b* (collectively 110) that are configured to generate light beams. In an embodiment, the light sources 108 and 110 may produce light beams having different spectral ranges (see, for example, FIG. 8). Alternatively, the light sources 108 and 110 may produce light beams having the same spectral ranges (see, for example, FIG. 8). Still yet, the light sources 108 and 110 may produce light beams having spectral ranges that partly overlap.

Moreover, the handheld barcode reader 100 may use different illumination approaches, including (i) a bright field using light source that directly illuminates in almost orthogonal conditions, and (ii) a polarized field using a linearly or circularly polarized light that illuminates an orthogonally linearly or circularly polarized window in front of receiving optics, and (iii) diffusive field using an emission by diffusive surfaces shaped to cones or similar surrounding field-of-view of the handheld barcode reader 100. The handheld barcode reader 100 being capable of producing a combination of the light fields or beams may provide the ability to read almost all of the types of DPM codes that are used.

In an embodiment, the light sources 108 may produce a bright field source or light beam that is non-polarized as a result of not having a polarized exit window or polarized filter disposed in front of the light sources 108. The light sources 110, however, may produce light beams that are polarized and/or become polarized as a result of portions of the exit window 106 being polarized or a polarizing filter being disposed between the light sources 110 and the exit window 106. The polarized portions of the exit window 106 or polarizing filters may be linearly or circularly polarized. It should be understood that the light sources 108 and 110 may each include one or more light sources to enable the functionality of reading DPM codes using functionality, as described hereinbelow.

A light or image sensor 112 is shown to be located behind the exit window 106. In accordance with the principles described herein, a partially polarized receiving window (see FIG. 7) and receiving optics (also see FIG. 7) may also be included as part of the handheld barcode reader 100. In addition to the light sources 108 and 110, additional light source(s) (see FIGS. 2 and 7) may also be included to generate a diffused light beam for illuminating DPM codes disposed on certain materials. In addition to the light sources 108 and 110 for illuminating in reading DPM codes on objects, indicator light sources 114 and 116 may be included in the handheld barcode reader 100 to output a green or red light for a user to see on an object being imaged so as to indicate whether a DPM code was correctly or incorrectly decoded.

Figure 2:
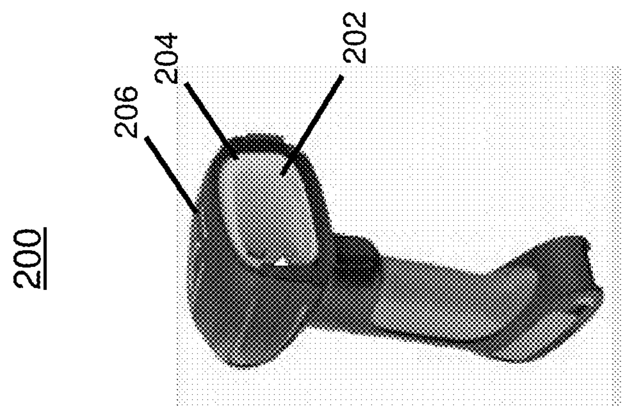
FIG. 2 is an illustration of an illustrative handheld barcode reader capable of outputting a diffused light beam by including a diffusive transmitting surface within a window region defined by a housing.

With regard to FIG. 2, an illustrative handheld barcode reader 200 capable of outputting a diffused light beam by including a diffusive transmitting surface 202 within a window region 204 defined by a housing 206 is shown. The diffusive transmitting surface 202 may be positioned in front of one or more light sources (see FIG. 8, for example) that produce a diffused light beam that are defused by the diffusive transmitting surface 202. The diffused light beam may be used to read DPM codes or other machine-readable indicia from materials (e.g., metal surface with optical finishing) of objects that are read better with diffusive light, as compared to bright light or polarized light. In an embodiment, the diffusive transmitting surface 202 may be incorporated into the barcode reader of FIG. 1, thereby providing for three illumination options for reading DPM codes or other machine-readable indicia on objects with different surface material types.

Figure 3:
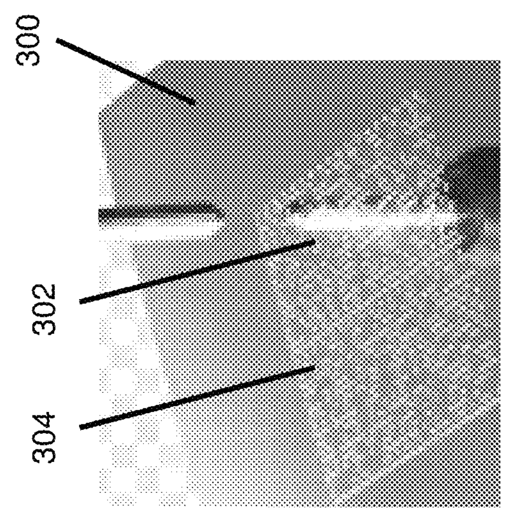
FIG. 3 is an illustration of an object having a high reflective surface.

With regard to FIG. 3, an illustration of an object 300 having a high reflective surface 302 is shown. The object 300 may be made of metal or any other material that causes a high degree of reflectance. As understood in the art, when a high reflectance occurs, an image sensor may be "blinded" in part or in whole as a result of illuminating the surface with a diffusive light. To accommodate imaging a DPM code 304 disposed on the high reflectance surface 302, polarized light may be utilized by a handheld barcode reader in scanning the DPM code 304 to reduce or avoid blinding the image sensor.

Figure 4:
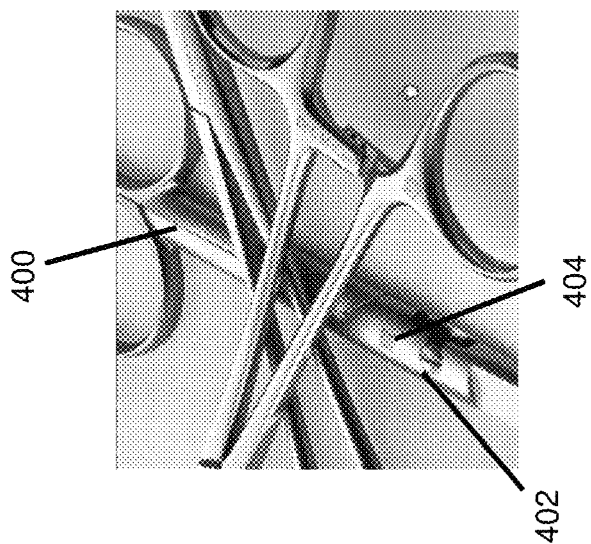
FIG. 4 is an illustration of an object having a matte finish surface.

With regard to FIG. 4, an illustration of an object 400 having a matte finish surface 402 is shown. The object 400 may be made of metal or any other material with a matte finish or any other finish that causes a dull reflectance. As understood in the art, when a dull reflectance exists, a polarized light may be used by a barcode reader to provide additional contrast between a DPM code 404 and the surface 402.

Figure 5:
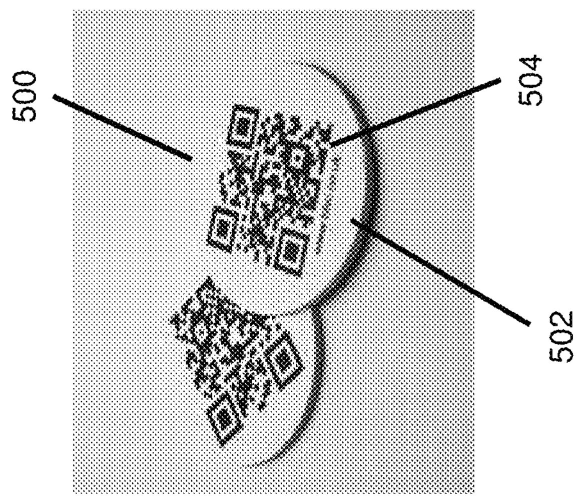
FIG. 5 is an illustration of an object formed of plastic and having a limited reflective surface.

With regard to FIG. 5, an illustration of an object 500 formed of plastic and having a limited reflective surface 502 is shown. The object 500 may be made of any other material that has a limited reflective surface. To accommodate imaging a DPM code 504 disposed on the limited reflective surface 502, bright light may be utilized by a handheld barcode reader in scanning the DPM code 504. It should be understood that the objects 300, 400, and 500 of FIGS. 3-5 are illustrative, and that additional objects with different surface material types are contemplated such that the lighting embodiments provided herein could be usable on the different surfaces and/or other lighting solutions (e.g., different wavelengths or spectral ranges) could be used or added to the handheld barcode reader to provide the same or similar power-efficient solution.

Figures 6A, 6B:
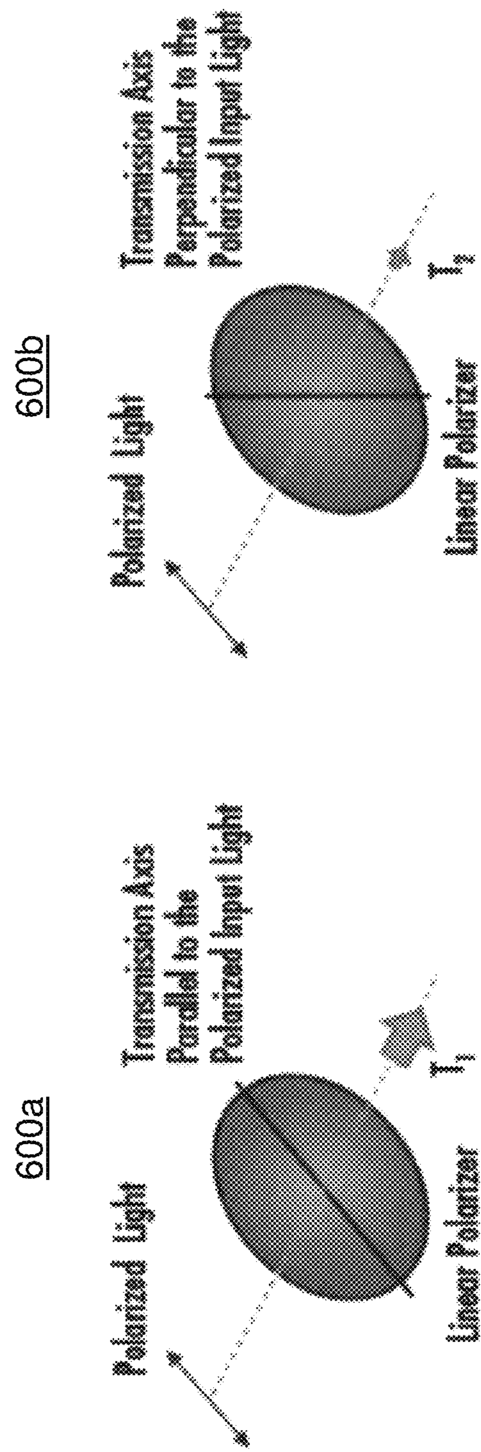
FIGS. 6A and 6B are illustrations of illustrative linear polarization models.

With regards to FIGS. 6A and 6B, illustrations of illustrative linear polarization models 600*a* and 600*b* are shown. The polarization properties of a linear polarizer are typically defined by the degree of polarization or polarization efficiency (P) and an extinction ratio ($\rho_p$). Following the formalism defined in the Handbook of Optics, the principal transmittances of the polarizer are $T_1$ and $T_2$. In accordance with the principles described herein, $T_1$ is the maximum transmission of the polarizer and occurs when the axis of the polarizer is parallel to the plane of polarization of the incident polarized beam. $T_2$ is the minimum transmission of the polarizer and occurs when the axis of the polarizer is perpendicular to the plane of polarization of the incident polarized beam. The polarization efficiency (P) and extinction ratio ($\rho_p$) may be computed, as follows:

$$P=(T_1-T_2)/(T_1+T_2)$$

$$\rho_P=T_2/T_1$$

The term "partially" polarized window means a linearly polarized window that may have the following metrics: (i) a spectral region having a dominant polarization plane (i.e., polarized spectral region) and (ii) spectral region without any dominant polarization plane (i.e., not polarized spectral region). In an alternative embodiment, a partially polarized window may mean having a polarization filter positioned in front of receiving optics and the following light sources may be used: (i) polarized light sources with dominant wavelengths in a polarized spectral region for the polarized field, and (ii) light source with dominant wavelengths in the not polarized spectral region for the diffusive and bright fields. With the term "partially" polarized window, a window may be a single and homogeneous material that has different behavior depending on wavelength of the light passing therethrough, where the partially polarized window may have the following two illustrative spectral regions in the wavelength range of 400 nm-900 nm:

Polarized spectral region ($P>0.75$ and $T_1>0.7$).

Not polarized spectral region ($P<0.2$ and $T_1>0.5$).

Figure 7:
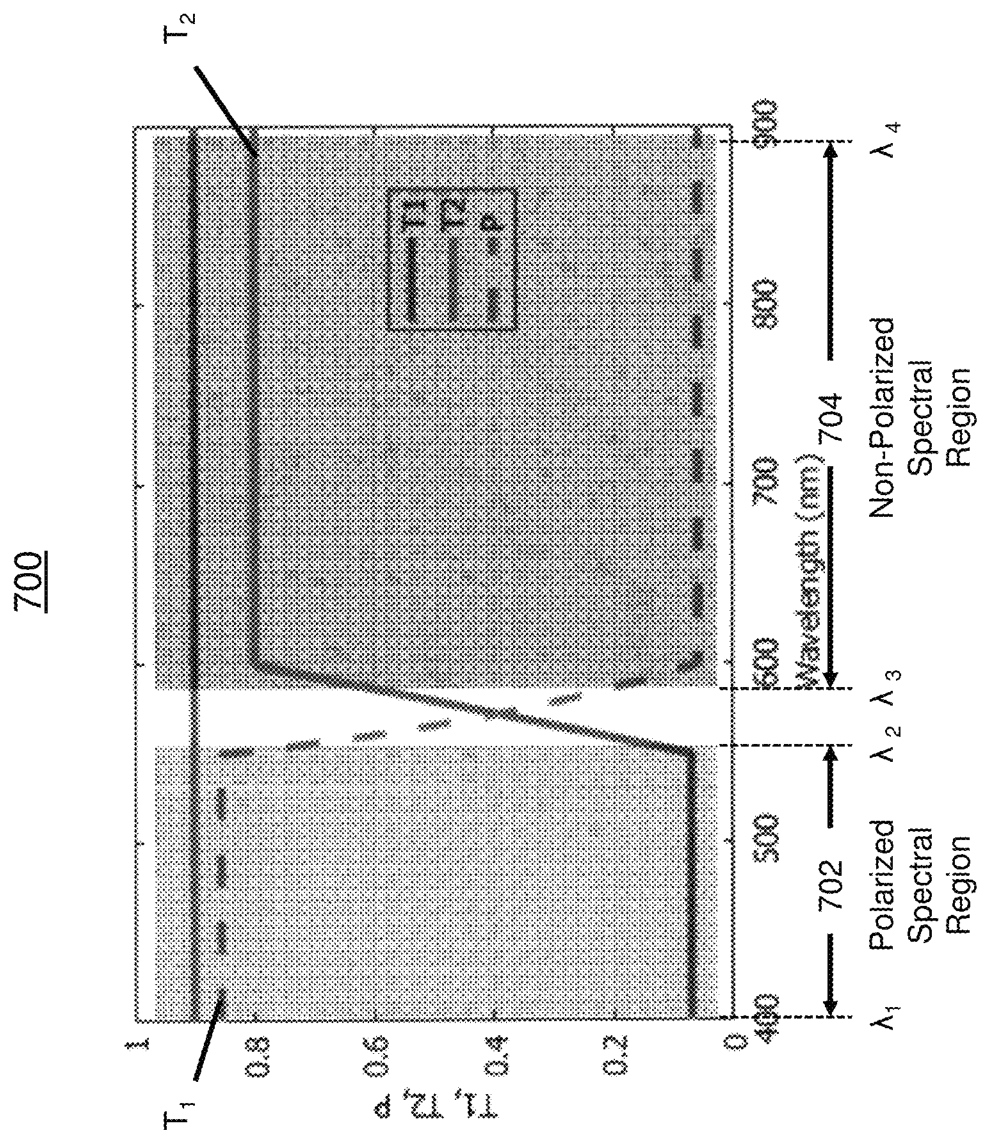
FIG. 7 is a graph is shown to include a number of transmission curves of a "partial" polarized window over a spectral range extending between wavelengths 400 nm and 900 nm.

With regard to FIG. 7, a graph is shown to include transmission curves $T_1$ and $T_2$ of a "partial" polarized window 700 over a spectral range extending between wavelengths 400 nm and 900 nm is shown. In this case, there are two sub-spectral regions 702 and 704, where a first spectral region 702 extends between wavelengths $\lambda_1$-$\lambda_2$ (e.g., 400 nm-550 nm) is that of a polarized spectral region, and a second spectral region 704 extending between wavelengths $\lambda_3$-$\lambda_4$ (e.g., 575 nm-900 nm) is that of a non-polarized spectral region. As provided in FIG. 8, the sub-spectral regions may be formed using linear polarizer(s) and no optical filters to create the polarized and non-polarized sub-spectral regions. Other optical components and processes to produce sub-spectral regions having the same or similar properties may also be utilized.

The wavelengths of the different fields may be generated to stay inside the following ranges:

Dominant wavelength of polarized light source: $\lambda_{polarized} \in$ polarized spectral region.

Dominant wavelengths of diffusive and bright light sources: $\lambda_{diffusive}$ and $\lambda_{right}$ $\in$ not polarized spectral region.

Figure 8:
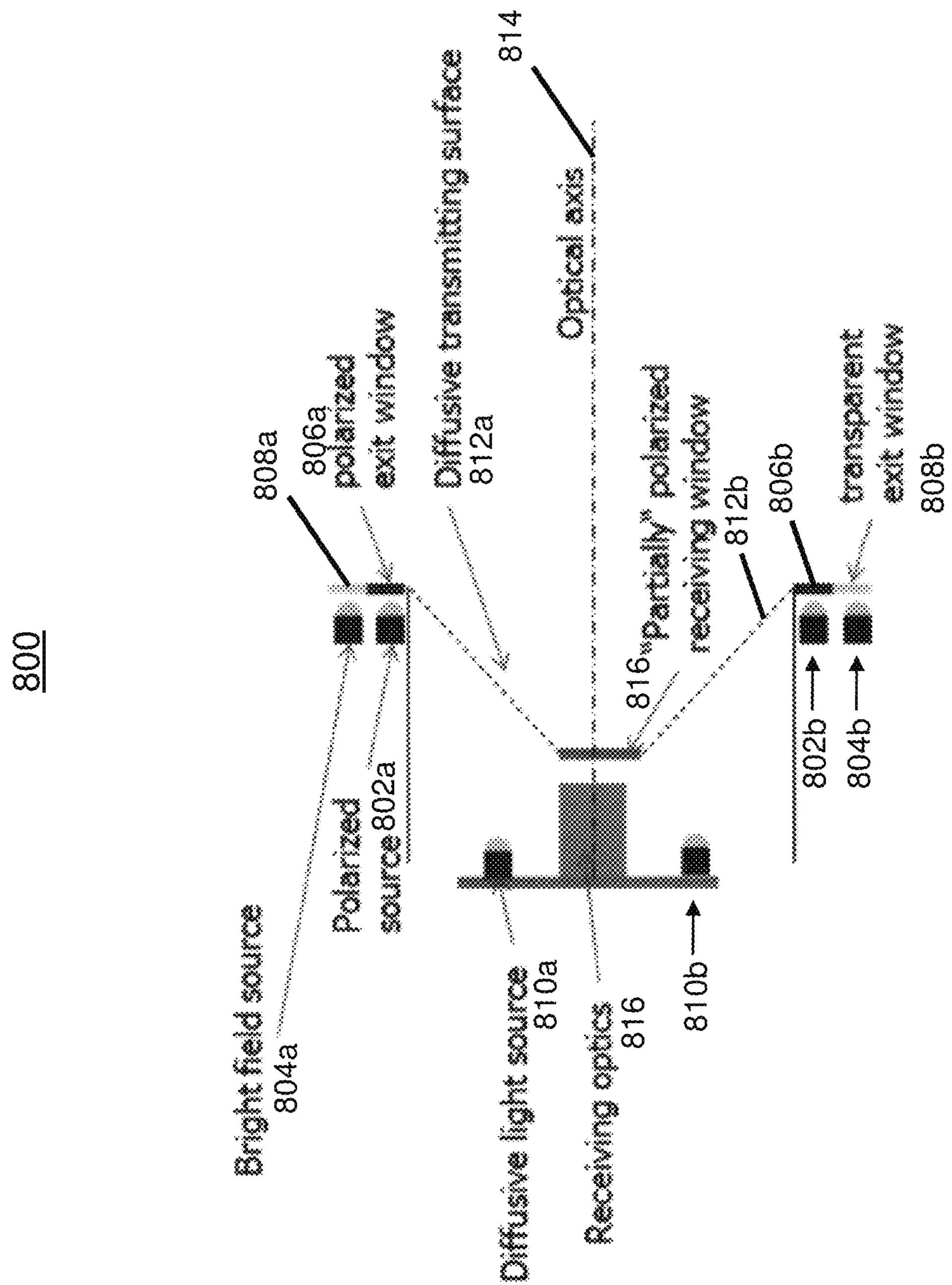
FIG. 8 is an illustration of an illustrative lighting system of a handheld barcode reader according to the principles described herein.

With regard to FIG. 8, an illustration of an illustrative lighting system 800 of a handheld barcode reader that performs the functions according to the principles described herein is shown. The lighting system 800 may include one or more polarized light sources 802*a* and 802*b* (collectively 802) and bright field light sources 804*a* and 804*b* (collectively 804). In an embodiment, the polarized sources 802 may output polarized light. Alternatively, the polarized light sources 802 may generate non-polarized light. An exit window may have polarized exit window portions 806*a* and 806*b* (collectively 806) and transparent or non-polarized exit window portions 808*a* and 808*b* (collectively 808). In an alternative embodiment, the entire exit window may be transparent and a polarized filter may be disposed between the polarized light sources 802 and the exit window.

In an embodiment, one or more diffusive light sources 810*a* and 810*b* (collectively 810) may be used to produce diffusive lighting by illuminating diffusive transmitting surfaces 812*a* and 812*b* (collectively 812). The diffusive transmitting surfaces 812 may be conical or have any other shape that is colored or textured to produce a diffusive lighting to illuminate an object with a DPM code.

As shown, an optical axis 814 may be centrally aligned on a partially polarized receiving window 816 that receives reflected light from an object including a DPM code, where the reflected light may be from any of the polarized light sources 802, bright field light sources 804, and/or diffusive light sources 810. Also centrally aligned with the optical axis 814 may be receiving optics 818. The optical system may be contained within a housing of a handheld barcode reader, such as the handheld barcode reader of FIG. 1.

Figure 9:
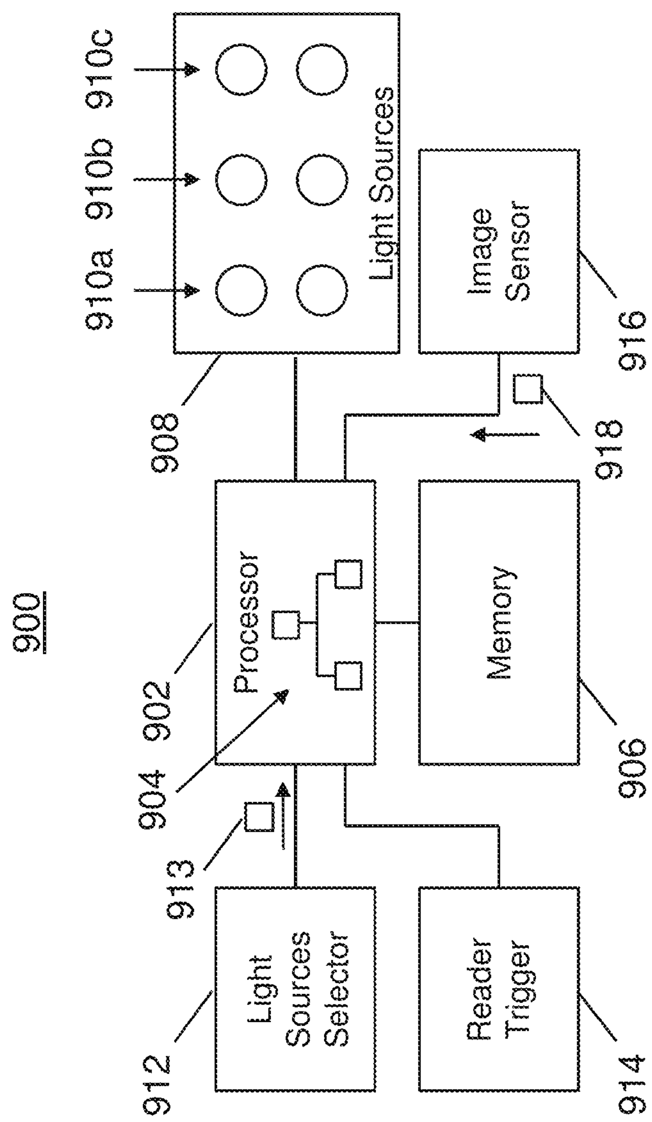
FIG. 9 is an illustration of an illustrative electro-optical system for use in a handheld barcode reader for performing the DPM code reading functions described herein.

With regard to FIG. 9, an illustration of an illustrative electro-optical system 900 for use in a handheld barcode reader for performing the DPM code reading functions described herein is shown. The electro-optical system 900 may include a processor 902 configured to execute software 904 for controlling other electronic devices and processing data of DPM codes, as described hereinbelow. The processor 902 may be in communication with a non-transitory memory configured to store software and/or data (e.g., image data, data represented by DPM codes, etc.) for performing the functionality of a barcode reader in reading DPM codes using a partially polarized exit window or lighting path.

The processor 902 may further be in communication with sets of lighting sources 910*a*, 910*b*, and 910*c* (collectively 910). Each of the sets of lighting source 910 may include one or more lighting sources (e.g., LEDs) that operate over the same or different wavelengths or spectral ranges. In an embodiment, the lighting sources 910*a* may be used to generate polarized light, lighting sources 910*b* may be used to generate bright light that is non-polarized, and light sources 910*c* may be used to generate diffused light, as previously described with regard to FIGS. 7 and 8. Although not shown, it should be understood that electronic drivers for driving the lighting sources 910 may be utilized, as well, and be in communication with the processor 902.

A lighting sources selector 912 may be in electrical communication with the processor 902. The lighting sources selector 912 may be a switch, either a physical switch or soft-switch (e.g., selectable graphical user element on an electronic display), that a user of the handheld barcode reader may use to select which of the light sources 910*a*, 910*b*, and/or 910*c* to turn on when performing DPM code reading. For example, if the user is to read a DPM code on a piece of metal with a reflective surface, then the user may set the lighting sources selector 912 to cause the light sources 910*a* to turn on to generate a diffused light beam. Alternatively, if the user is to use the barcode reader to read the DPM codes on a piece of metal with a matte finish, then the user may set the light sources selector 912 to turn on the light sources 910*b* to generate a polarized light beam when performing a reading of the DPM code on the matte finish surface of the object. Still yet, if the user is to use the barcode reader to read DPM codes on a piece of plastic or other material, then the user may set the light sources selector 912 to turn on the lighting sources 910*c* to generate a bright light beam, which may perform the highest quality reading for that type of surface. In an alternative environment, the software 904 may be configured with an automatic mode to perform imaging of a DPM code using one or more of the light sources 910 in mutually exclusive succession (e.g., successively turn on and off lighting sources 910*a* through 910*c*) and capture images with each of those lighting sources turned on. The software 904 may be configured to determine which of images captured with the respective lighting sources resulted in the highest quality imaging and decoding of the DPM code. It should be understood that additional manual, semi-automatic, or automatic processes may be utilized in performing DPM code reads using the electro-optical system of 800 of FIG. 8 or a variance thereof.

In operation, a user may interact with a reader trigger 914 that may be configured to instruct the processor 902 to initiate a DPM code read by turning on selected light sources 910. During a read operation, an image sensor 916 may be configured to capture an image of a DPM code positioned on an object using reflected light from any of the light sources 910. The image sensor 916 may be in electrical communication with the processor and communicate image data 918 to the processor 902 to be processed by the software 904 being executed thereby. The processing unit 902 may be configured to perform image preprocessing to adjust the image data, decoding of DPM codes, reading DPM codes, and generating output data to cause the barcode reader to notify the user that the DPM code was properly or not properly decoded. In an embodiment, the processor 902 may communicate with an electronic display 918 to notify the user of the DPM code that was read along with any other information represented by the DPM code (e.g., product identifier). In addition, light sources 910*b* may be configured to output light with a certain wavelength, such as red or green, that may be illuminated onto the DPM code being read, thereby visually indicating to the user that the DPM code was successfully or unsuccessfully decoded and read by the barcode reader.

Figure 10:
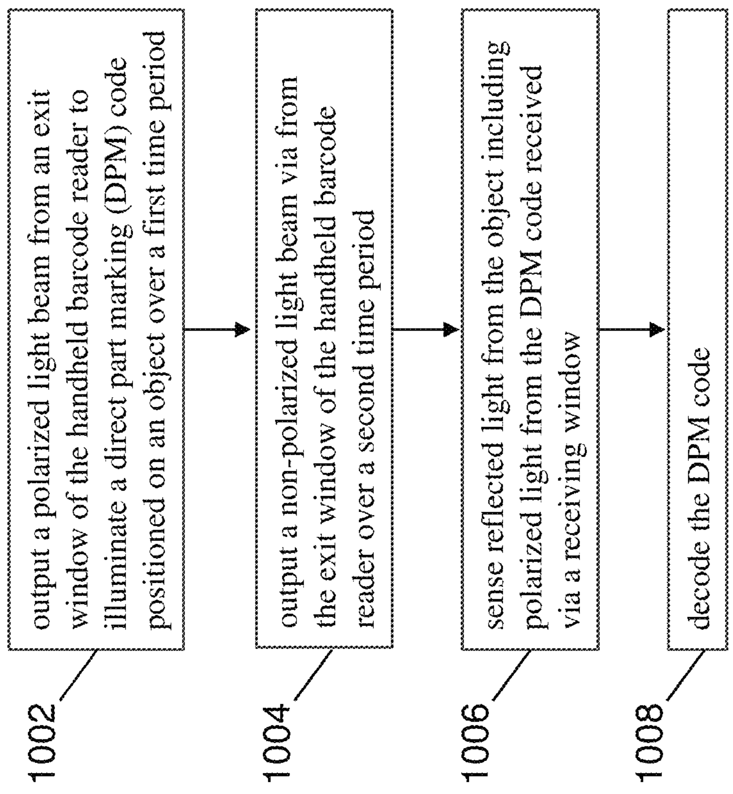
FIG. 10 is a flow diagram of an illustrative process for imaging DPM codes by a handheld barcode reader using the principles described herein.

With regard to FIG. 10, a flow diagram of an illustrative process for imaging DPM codes by a handheld barcode reader using the principles described herein is shown. At step 1002, a polarized light beam may be output from an exit window of the handheld barcode reader to illuminate a direct part marking (DPM) code positioned on an object over a first time period. At step 1004, a non-polarized light beam may be output via from the exit window of the handheld barcode reader over a second time period. Reflected light from the object including polarized light from the DPM code received via a partially polarized receiving window may be sensed at step 1006. The DPM code may be decoded by the handheld barcode reader at step 1008.

In an embodiment, outputting the polarized light beam from the exit window may include outputting the polarized light beam as a result of a polarizing filter being a portion of the exit window. In another embodiment, outputting the polarizing light beam may include generating the polarized light beam prior to outputting the polarized light beam from the exit window. A first light beam generated with a first spectral range may be output as the polarized light beam from the exit window, and a second light beam generated with a second spectral range may be output from a transparent portion of the exit window.

The process may further include generating a diffused light beam, and outputting the diffused light beam via the exit window. In an embodiment, the polarized, non-polarized, and diffusive light beams may be mutually exclusively generated. A user may be enabled to selectably turn on light sources to generate the polarized or non-polarized light beams. At least one of a first light source or second light source may be automatically selected to produce the polarized or non-polarized light beams. In an embodiment, the first light source and the second light source may be automatically sequentially and mutually exclusively turned on to capture sequential images of the DPM indicia.

One embodiment of a method of manufacturing a handheld barcode reader may include arranging a first lighting source within a housing of the handheld barcode reader to generate a light beam via a polarized light path to output a polarized light beam through an exit window of the handheld barcode reader. A second lighting source may be arranged within the housing of the handheld barcode reader to generate a non-polarized light path to output a non-polarized light beam through the exit window of the handheld barcode reader.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A handheld barcode reader, comprising:

a housing defining an opening;

an exit window disposed in the opening of the housing;

a first light source disposed within the housing;

a polarizing filter disposed in front of the first light source to cause a polarized light beam to illuminate a direct part marking (DPM) code on an object;

a second light source disposed within the housing, and arranged to output a non-polarized light beam via a transparent portion of the exit window;

a third light source and a diffusive transmitting surface through which the third light source directs a light beam to produce a diffusive light beam relative to the polarized light beam of the first light source and the non-polarized light beam of the second light source;

receiving optics configured to receive reflected light from the object and including light representative of the DPM code via a partially polarized receiving window including both a polarized spectral region extending from a first wavelength to a second wavelength and a non-polarized spectral region extending from a third wavelength to a fourth wavelength;

an optical sensor configured to sense the reflected light via the receiving optics and generate image data; and a processor configured to process the image data to decode and read the DPM code.

2. The handheld barcode reader according to claim 1, wherein the first and second light sources output light beams over different spectral ranges.

3. The handheld barcode reader according to claim 2, wherein a dominant wavelength of the first light source is within the polarized spectral region of the partially polarized receiving window, wherein a dominant wavelength of the second light source is within the non-polarized spectral region of the partially polarized receiving window, and wherein a dominant wavelength of the third light source is within the non-polarized spectral region of the partially polarized receiving window.

4. The handheld barcode reader according to claim 1, wherein the polarizing filter is a portion of the exit window.

5. The handheld barcode reader according to claim 1, further comprising electronics configured to mutually exclusively power the first, second, and third light sources.

6. The handheld barcode reader according to claim 5, wherein the electronics are user configurable to turn on the first light source or the second light source.

7. The handheld barcode reader according to claim 5, wherein the electronics are configured to automatically turn on at least one of the first, second, or third light sources.

8. The handheld barcode reader according to claim 1, wherein the electronics are configured to automatically sequentially and mutually exclusively turn on at least two light sources to capture sequential images of the DPM indicia.

9. The handheld barcode reader according to claim 1, wherein the partially polarized receiving window is a single and homogeneous material that has different behavior depending on wavelength of the reflected light from the object.

10. The handheld barcode reader according to claim 1, wherein:

the receiving optics and receiving window are positioned in a first position;

the polarizing filter is positioned on a first side of an optical axis of the receiving optics and receiving window;

the transparent portion of the exit window is positioned on a second side of the optical axis; and the diffusive transmitting surface extending from a first portion of the receiving window to the polarizing filter and from a second portion of the receiving window to the transparent portion of the exit window.

11. The handheld barcode reader according to claim 10, wherein the polarizing filter and exit window are positioned longitudinally forward of the receiving window, and wherein the diffusive transmitting surface diagonally extends between the receiving window and polarizing filter and from the receiving window to the transparent portion of the exit window.

12. A method for operating a handheld barcode reader, comprising:

outputting a polarized light beam from an exit window of the handheld barcode reader to illuminate a direct part marking (DPM) code positioned on an object over a first time period;

outputting a non-polarized light beam via from the exit window of the handheld barcode reader over a second time period;

outputting a diffused light beam from a third light source via the exit window, the diffused light beam being diffused relative to the polarized light beam and the non-polarized light beam;

sensing reflected light from the object including at least one of polarized light, non-polarized light, or diffused light, from the DPM code received via a partially polarized receiving window including both a polarized spectral region extending from a first wavelength to a second wavelength and a non-polarized spectral region extending from a third wavelength to a fourth wavelength; and decoding the DPM code.

13. The method according to claim 12, wherein outputting the polarized light beam includes generating a first light beam including a dominant wavelength within the polarized spectral region of the partially polarized receiving window, wherein includes generating a second light beam including a dominant wavelength within a non-polarized spectral region of the partially polarized receiving window, and wherein outputting the diffused light beam includes generating a third light beam including a dominant wavelength within the non-polarized spectral region of the partially polarized receiving window.

14. The method according to claim 12, wherein outputting the polarized light beam from the exit window includes outputting the polarized light beam as a result of a polarizing filter being a portion of the exit window.

15. The method according to claim 12, wherein outputting the polarizing light beam includes generating the polarized light beam prior to outputting the polarized light beam from the exit window.

16. The method according to claim 12, further comprising mutually exclusively generating the polarized, non-polarized, and diffusive light beams.

17. The method according to claim 12, further comprising enabling a user to manually selectably turn on light sources to generate the polarized, non-polarized, or diffusive light beams.

18. The method according to claim 12, further comprising automatically selecting at least one of the first light source, the second light source or the third light source.

19. The method according to claim 18, wherein automatically selecting at least one of the first light source, the second light source or the third light source includes switching from one light source to another light source responsive to a measured parameter not meeting a threshold level.

20. The method according to claim 18, wherein automatically selecting at least one of the first light source, the second light source or the third light source includes switching from one light source to another light source responsive to failing to decode the DPM code.

* * * * *